(12) United States Patent
Woodward (10) Patent No.: US 12,196,293 B2
(45) Date of Patent: Jan. 14, 2025

(54) COUNTER ROTATING GEAR DRIVE AND ASSOCIATED SYSTEMS, COMPONENTS, AND METHODS

(71) Applicant: GIG Energy LLC, Provo, UT (US)

(72) Inventor: Jon Woodward, Mapleton, UT (US)

(73) Assignee: GIG Energy LLC, Provo, UT (US)

( * ) Notice: Subject to any disclaimer, the term of this patent is extended or adjusted under 35 U.S.C. 154(b) by 0 days.

(21) Appl. No.: 18/496,773

(22) Filed: Oct. 27, 2023

(65) Prior Publication Data

US 2024/0141970 A1 May 2, 2024

Related U.S. Application Data

(60) Provisional application No. 63/381,411, filed on Oct. 28, 2022.

(51) Int. Cl.
*F16H 3/56* (2006.01)
*F16H 3/66* (2006.01)

(52) U.S. Cl.
CPC ....... *F16H 3/56* (2013.01); *F16H 2200/0069* (2013.01); *F16H 2200/201* (2013.01)

(58) Field of Classification Search
CPC ... F16H 3/72; F16H 3/724; F16H 3/56; F16H 2200/0069; F16H 2200/201; F16H 2200/2007; F16H 3/62; H02K 7/116
See application file for complete search history.

(56) References Cited

U.S. PATENT DOCUMENTS

| | | | |
|---|---|---|---|
| 2003/0232682 A1* | 12/2003 | Rogers | F16H 48/11 475/221 |
| 2018/0058546 A1 | 3/2018 | Shinohara et al. | |
| 2019/0154147 A1* | 5/2019 | Lohr, III | F16H 3/663 |
| 2019/0170221 A1 | 6/2019 | Okamoto et al. | |

FOREIGN PATENT DOCUMENTS

| | | | | |
|---|---|---|---|---|
| CN | 206290394 U | | 6/2017 | |
| CN | 114076186 A | * | 2/2022 | ............... F16H 3/72 |
| CN | 215890982 U | * | 2/2022 | ............... F16H 3/76 |
| DE | 102019119948 A1 | * | 1/2021 | ............... B60K 1/00 |
| DE | 102019219232 A1 | * | 6/2021 | ............ B60K 17/08 |
| JP | 2012-112520 A | | 6/2012 | |
| KR | 20120051523 A | * | 5/2001 | ............... F16H 3/66 |
| KR | 10-2017-0062313 A | | 6/2017 | |

OTHER PUBLICATIONS

International Search Report for Application No. PCT/US2023/078119 dated Feb. 20, 2024, 4 pages.
International Written Opinion for Application No. PCT/US2023/078119 dated Feb. 20, 2024, 5 pages.

* cited by examiner

*Primary Examiner* — Tisha D Lewis
(74) *Attorney, Agent, or Firm* — TraskBritt (57) ABSTRACT

A gear box includes a first planetary gear and a second planetary gear. The gear box further includes a first carrier of the first planetary gear coupled to a second ring gear of the second planetary gear. The gear box also includes a first ring gear of the first planetary gear coupled to a second carrier of the second planetary gear. The gear box further includes a first sun gear of the first planetary gear coupled to a first output shaft. The gear box also includes a second sun gear of the second planetary gear coupled to a second output shaft.

16 Claims, 8 Drawing Sheets

COUNTER ROTATING GEAR DRIVE AND ASSOCIATED SYSTEMS, COMPONENTS, AND METHODS

CROSS-REFERENCE TO RELATED APPLICATION

This application claims the benefit under 35 U.S.C. § 119(e) of U.S. Provisional Patent Application Ser. No. 63/381,411, filed Oct. 28, 2022, the disclosure of which is hereby incorporated herein in its entirety by this reference.

TECHNICAL FIELD

Embodiments of the present disclosure generally relate to gear drives or gear boxes. In particular, embodiments of the present disclosure relate to counter rotating gear drives or gear boxes and associated systems, components, and methods.

BACKGROUND

Gear drives or gear boxes are used to modify a force or energy input into the gear drive. For example, gear drives may be used to create a mechanical advantage, such as a force or torque multiplier. A relatively small force or torque may be input into the gear drive. The gear drive may include multiple gears of different sizes interfacing with one another through a mesh between teeth of the multiple gears and/or shafts coupled between gears, such that an output from the gear drive may be a larger force or torque than the input force or torque. In another example, the gear drive may modify a rotational speed of an input. The input may be a relatively low speed and the multiple different sized gears within the gear drive may cause an output of the gear drive to have a higher rotational speed than the input.

Gear drives and/or gear boxes are used in many different applications. For example, a transmission and/or differential in an automobile as well as in other vehicles each use different types of gear boxes to obtain mechanical advantages and/or speed differences to efficiently transfer mechanical energy from the motor (e.g., internal combustion engine, electric motor, etc.) to the tires to cause the vehicle to move. Gear drives and/or gear boxes may also be used in or in association with an electrical generator to increase a rotational speed of the input from the power input, such as from a wind turbine, steam turbine, internal combustion engine, etc., to the rotor of the electric generator to increase the amount of power generated and improve the efficiency of the electrical generator.

BRIEF SUMMARY

Embodiments of the disclosure include a gear box. The gear box includes a first planetary gear and a second planetary gear. The gear box further includes a first carrier of the first planetary gear coupled to a second ring gear of the second planetary gear. The gear box also includes a first ring gear of the first planetary gear coupled to a second carrier of the second planetary gear. The gear box further includes a first sun gear of the first planetary gear coupled to a first output shaft. The gear box also includes a second sun gear of the second planetary gear coupled to a second output shaft.

Another embodiment of the disclosure includes a method of transferring motion. The method includes receiving a rotational input in a first direction at a first carrier of a first planetary gear. The method further includes rotating a second ring gear of a second planetary gear through a first coupling between the first carrier and the second ring gear. The method also includes coupling a second carrier of the second planetary gear to a first ring gear of the first planetary gear through a second coupling between the first ring gear and the second carrier. The method further includes causing a first output shaft to rotate in the first direction through a first drive interface between a first set of planet gears coupled to the first carrier and a first sun gear, the first output shaft coupled to the first sun gear. The method also includes causing a second output shaft to rotate in a second direction opposite the first direction through a second drive interface between a second set of planet gears coupled to the second carrier and a second sun gear, the second output shaft coupled to the second sun gear.

Another embodiment of the disclosure includes a gear drive. The gear drive includes a first rotational input and a second rotational input. The gear drive further includes a first planetary gear. The gear drive also includes a first carrier of the first planetary gear coupled to the first rotational input. The gear drive further includes a first ring gear of the first planetary gear coupled to the second rotational input. The gear drive also includes a first sun gear of the first planetary gear coupled to a first output shaft.

BRIEF DESCRIPTION OF THE DRAWINGS

While the specification concludes with claims particularly pointing out and distinctly claiming embodiments of the present disclosure, the advantages of embodiments of the disclosure may be more readily ascertained from the following description of embodiments of the disclosure when read in conjunction with the accompanying drawings in which:

DETAILED DESCRIPTION

The illustrations presented herein are not meant to be actual views of any particular gear drive or component thereof, but are merely idealized representations employed to describe illustrative embodiments. The drawings are not necessarily to scale.

As used herein, the term "about," when used in reference to a numerical value for a particular parameter, is inclusive of the numerical value and a degree of variance from the numerical value that one of ordinary skill in the art would understand is within acceptable tolerances for the particular parameter. For example, "about," in reference to a numerical value, may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, the term "substantially" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or even at least about 100% met.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the terms "vertical" and "lateral" refer to the orientations as depicted in the figures.

As described above, gear drives and/or gear boxes are used in many different applications. The mechanical advantages or speed modifications may be determined by a size difference between gears in the associated gear drive. The size difference is often captured as a difference in the number of teeth on each gear. For example, a large gear (e.g., large diameter gear) and a small gear (e.g., small diameter gear) may have teeth that are substantially the same size. This may result in the large gear having a larger number of teeth than the small gear. An interface of the teeth between the small gear and the large gear may result in the small gear rotating multiple times for every rotation of the large gear. Thus, if a rotational input is coupled to the large gear and an output is coupled to the small gear, the output would rotate multiple times for every rotation of the input. Similarly, a torque input into the small gear would be multiplied at an output from the large gear due to the difference in diameter of the large gear while the output from the large gear would have a slower rotational speed than the input.

As the size difference between gears increases the size of the gear drive also increases, such that larger gear ratios result in large gear drives that may be difficult to install in a smaller applications. Some types of gears assemblies are able to achieve larger gear ratios in smaller packages. For example, planetary gear sets are able to achieve larger gear ratios due to an interface between multiple nested gears.

Figure 1:
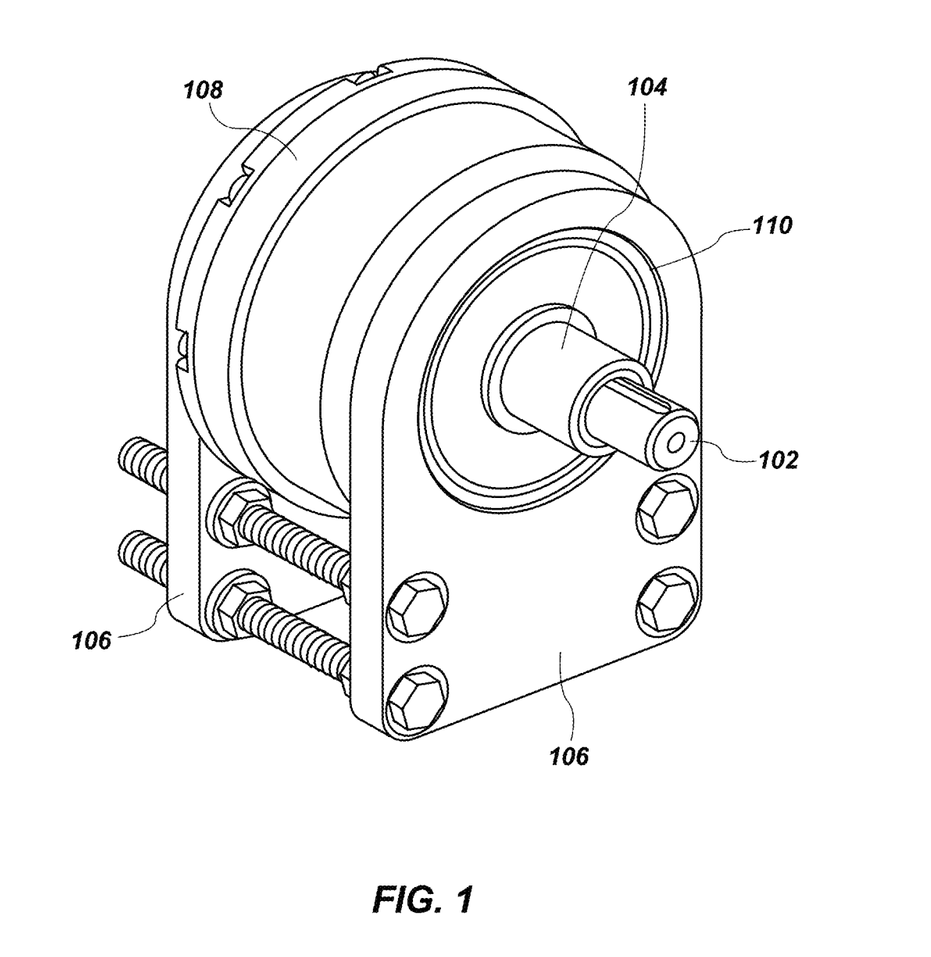
FIGS. 1 and 2 illustrate perspective views of a gear drive in accordance with embodiments of the disclosure.

FIG. 1 illustrates a gear drive 100. The gear drive 100 may be configured to receive a first input 102 and/or a second input 104, where the first input 102 rotates in a first direction and the second input 104 rotates in a second opposite direction. In some embodiments, the gear drive 100 may be configured to receive a single input through the first input 102. The first input 102 may be a shaft coupled to internal gears in the gear drive 100. The second input 104 may be coupled to a housing 108. The housing 108 may be configured to rotate independent from the first input 102.

The housing 108 may form an outer case configured to house (e.g., surround) the internal gears of the gear drive 100. The housing 108 may shield the internal gears from debris and other damage causing elements. The housing 108 may also be configured to maintain internal fluid, such as lubricants (e.g., oil, grease, etc.) within the housing 108 to reduce the wear on the internal gears, reduce friction losses in the internal gears, and extend the life of the internal gears. As described in further detail below, the housing 108 may be directly coupled to one or more of the internal gears to transfer motion to the internal gears and/or secure the internal gears relative to other internal gears.

The gear drive 100 may be suspended from one or more brackets 106. The brackets 106 may be configured to mount and/or secure the gear drive 100 to a component that is stationary relative to the gear drive 100. For example, if the gear drive 100 is mounted to an automobile or other vehicle, the brackets 106 may mount the gear drive 100 to a frame or body component of the vehicle that is stationary relative to the vehicle, such that the moving component of the vehicle that is coupled to the first input 102 and/or the second input 104 may move or rotate relative to the relatively stationary component. The brackets 106 may be configured to facilitate the housing 108 rotating relative to the bracket 106. For example, the housing 108 may be rotatably coupled to the brackets 106 through one or more bearings 110 (e.g., roller bearings, ball bearings, needle bearings, etc.).

Figure 2:
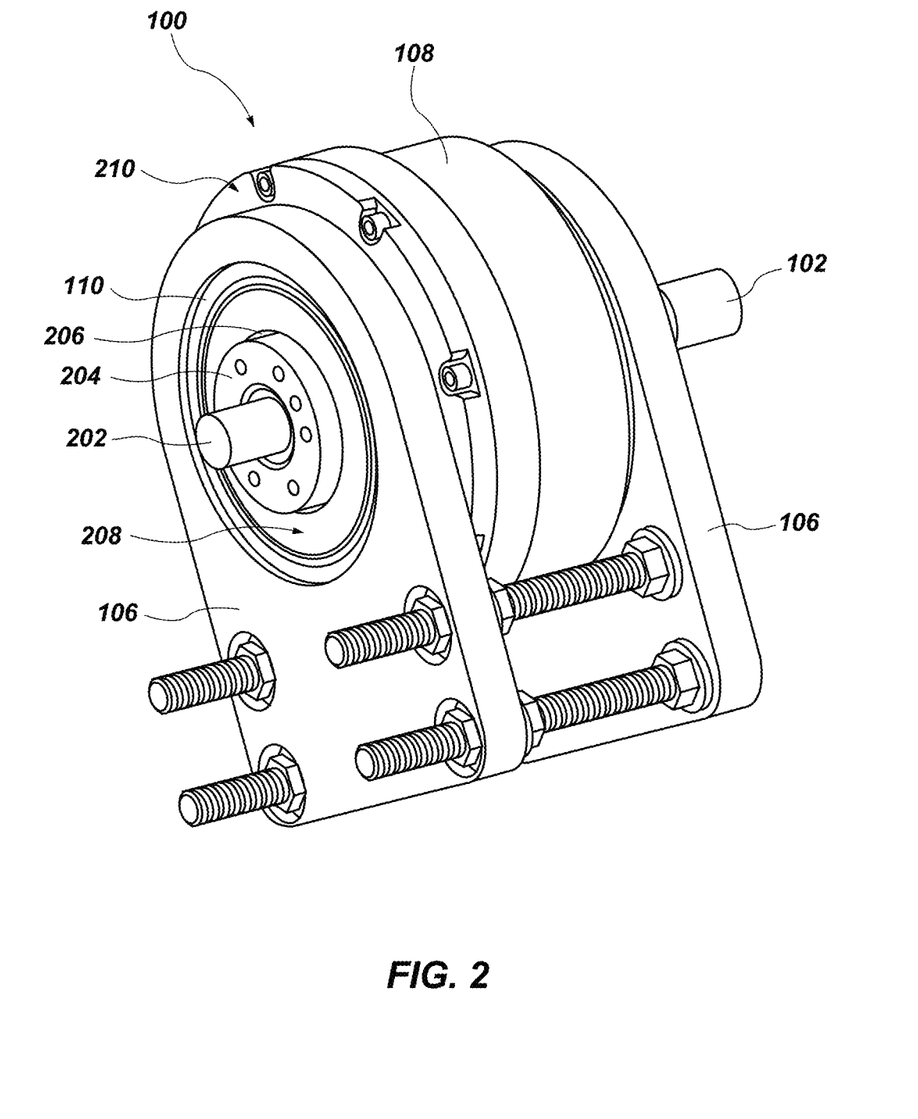

FIG. 2 illustrates a perspective view of an output side of the gear drive 100. The gear drive 100 may include a first output 202 and a second output 204. The first output 202 and the second output 204 may rotate in opposite directions. The second output 204 may rotate in a same direction as the first input 102 and the first output 202 may rotate in a second opposite direction. If a second input 104 is provided the first output 202 may rotate in the direction of the second input 104. If no second input 104 is provided, the first output 202 may continue to rotate in a direction opposite the direction of the first input 102. Thus, the gear drive 100 may output two distinct counter rotating outputs from a single input in a single direction.

The first output 202 and the second output 204 may exit the housing 108 through an aperture 206 defined in an end surface 208 of the housing 108. The end surface 208 may be formed from an end plate 210 secured to the housing 108. The end plate 210 may be removable to facilitate servicing the internal gears of the gear drive 100 (e.g., repairing components, replacing components, changing lubricant, etc.). The end surface 208 of the end plate 210 may further be configured to interface with another member such as a generator or a brake to control the rotation of the housing 108 via the bearings 110. The brake or generator may be utilized to control a perceived gear ratio of the gear drive 100.

Figure 3:
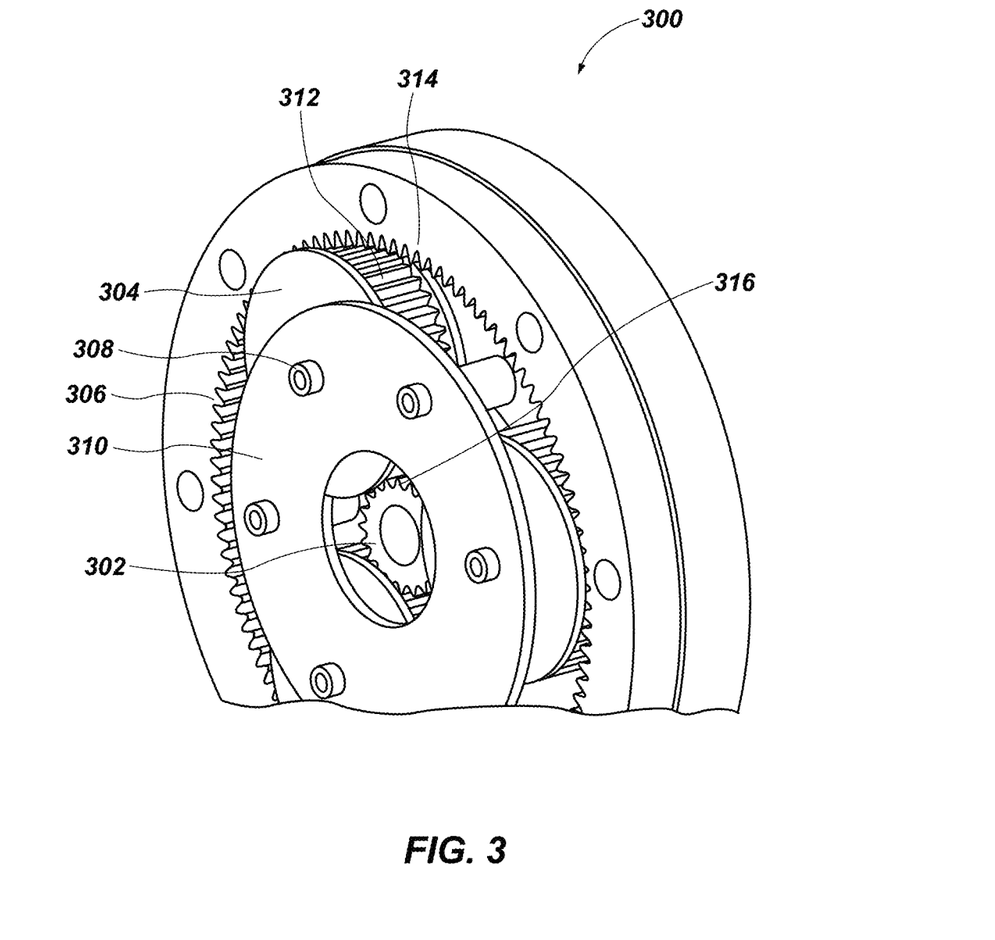
FIG. 3 illustrates a perspective view of a planetary gear in accordance with embodiments of the disclosure.

The internal gears of the gear drive 100 may be planetary gears. FIG. 3 illustrates a perspective view of a planetary gear 300. The planetary gear 300 includes a ring gear 306, planet gears 304, and a sun gear 302. The planet gears 304 may be coupled together by a carrier 310, such that the planet gears 304 move together between the ring gear 306 and the sun gear 302. The carrier 310 may be coupled to each of the planet gears 304 through spindles 308. The planet gears 304 may rotate about the spindles 308 while the carrier 310 rotates relative to the ring gear 306 and the sun gear 302. The ring gear 306 may include inward facing teeth 314, which may interface with teeth 312 of the planet gears 304. The teeth 312 of the planet gears 304 may subsequently interface with teeth 316 of the sun gear 302. Thus the planet gears 304 may transfer motion to at least one of the ring gear 306 and the sun gear 302. In some cases the planet gears 304 may transfer motion between the ring gear 306 and the sun gear 302.

Conventionally, one of the ring gear 306, the carrier 310, or the sun gear 302 is held stationary while the other two of the ring gear 306, the carrier 310, and the sun gear 302 is attached to a rotational input or a rotational output. The gear ratio of the planetary gear 300 is based on a difference in a number of teeth 314 in the ring gear 306 (R) and a number of teeth 316 in the sun gear 302 (S). The gear ratio also changes based on which of the ring gear 306, carrier 310, or sun gear 302 is held stationary. For example, if the ring gear 306 is held stationary the gear ratio is:

$$\frac{S}{R+S}$$

If the sun gear 302 is held stationary the gear ratio is:

$$\frac{R}{R+S}$$

If the carrier 310 is held stationary the gear ratio is:

S/R

In some instances, all three of the ring gear 306, the carrier 310, and the sun gear 302 may rotate. For example, two inputs and/or two outputs, may result in a single input coupled to one of the ring gear 306, the carrier 310, or the sun gear 302 and each of two outputs being coupled to one of the remaining ring gear 306, carrier 310, or sun gear 302. Alternatively, two inputs may be coupled to two of the ring gear 306, the carrier 310, or the sun gear 302 and an output may be coupled to the remaining ring gear 306, carrier 310, or sun gear 302. If all three of the ring gear 306, carrier 310, and sun gear 302 are rotating the gear ratio may be larger. The relative rotation of each of the ring gear 306, carrier 310, and the sun gear 302 become a function of the relative rotational speeds of the other components. For example, if the ring gear 306 and the carrier 310 are each coupled to separate inputs, such as the first input 102 and the second input 104, the rotational speed of the sun gear 302 is determined as follows:

$$Ts = \frac{(R+S)Ty - TrR}{S}$$

Where Ts is the rotational speed of the sun gear 302, Ty is the rotational speed of the carrier 310 and Tr is the rotational speed of the ring gear 306. If the ring gear 306 and the carrier 310 are rotating in opposite directions, the ratio increases significantly. For example, rotating the ring gear 306 and the carrier 310 in opposite directions may result in gear ratios of greater than 9:1, such as greater than 10:1 or greater than 12:1. Therefore, rotating the ring gear 306 and the carrier 310 in opposite directions through separate inputs may increase the output speed of the sun gear 302 relative to conventional applications.

Figure 4:
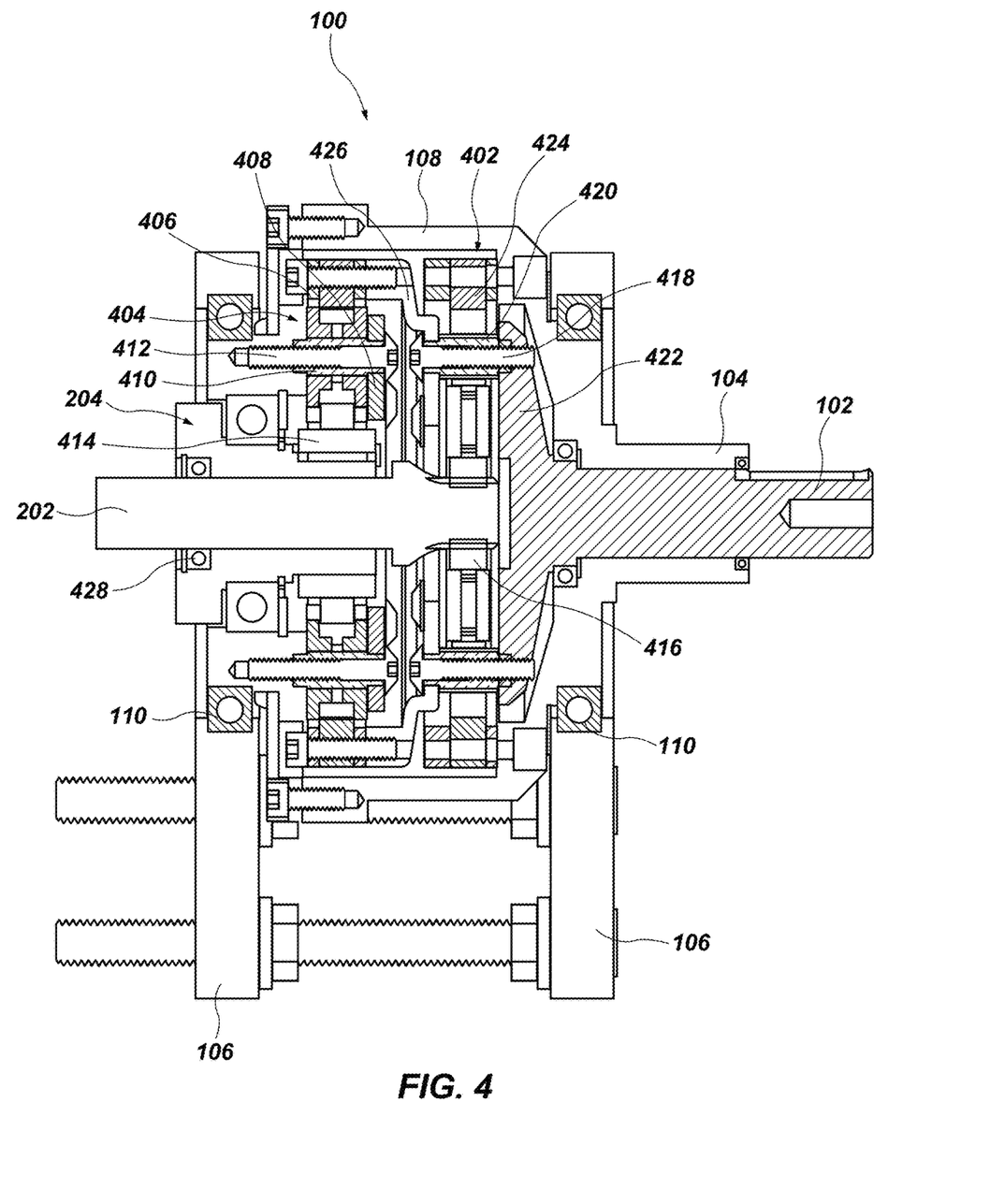
FIG. 4 illustrates a cross-sectional view of the gear drive of FIGS. 1 and 2.

FIG. 4 illustrates a cross-sectional view of the gear drive 100. The gear drive 100 may include a first planetary gear 402 and a second planetary gear 404. The first planetary gear 402 and the second planetary gear 404 may be axially aligned with the inputs 102, 104, and the outputs 202, 204.

The first input 102 may be coupled to a first carrier 422 of the first planetary gear 402. In some embodiments the first carrier 422 may be formed as part of the first input 102. For example, the first input 102 may be a shaft extending from the first carrier 422. Thus, the first carrier 422 and the associated first planet gears 420 may rotate in substantially the same direction and at substantially the same speed as the first input 102.

The first carrier 422 may be coupled to a second ring gear 406 of the second planetary gear 404 through a first input coupler 426. The first input coupler 426 may be coupled to the first carrier 422 through the first spindles 418 extending through the first planet gears 420. For example, the first input coupler 426 may be an extension of an interior portion of the first carrier 422 on an opposite side of the first planetary gear 402 from the first input 102. The first input coupler 426 may transfer rotation from the first input 102 to the second ring gear 406, such that the second ring gear 406 may rotate at substantially the same direction and at substantially the same speed as the first input 102 and the first carrier 422.

The housing 108 may be coupled to the first ring gear 424 and to the second carrier 408, such that the first ring gear 424 and the second carrier 408 may be fixed relative to the housing 108. The second carrier 408 may maintain second planet gears 410 in position relative to the housing 108 through second spindles 412. The first output 202 may be coupled to a first sun gear 416 of the first planetary gear 402 and the second output 204 may be coupled to a second sun gear 414 of the second planetary gear 404. If the housing 108 remains in a fixed position, the first input 102 may cause the first sun gear 416 to rotate in a same direction as the first input 102 at a speed multiplied by the gear ratio of (ring teeth+sun teeth):sun teeth of the first planetary gear 402. The first input coupler 426 may also cause the second ring gear 406 to rotate, which may cause the second sun gear 414 to rotate in a direction opposite the first input 102 at a speed multiplied by the gear ratio of ring teeth:sun teeth of the second planetary gear 404. Thus, the first sun gear 416 and the second sun gear 414 may rotate in opposite directions when a single input is received from the first input 102. The first sun gear 416 may cause the first output 202 to rotate in the direction of the first input 102 at the speed defined by the gear ratio of the first planetary gear 402 and the second sun gear 414 may cause the second output 204 to rotate in a direction opposite the first input 102 as the speed defined by the gear ratio of the second planetary gear 404.

As described above, the housing 108 may be coupled to the second input 104, such that the housing 108 may rotate in a direction opposite the first input 102. This may cause the first ring gear 424 of the first planetary gear 402 to rotate relative to the first carrier 422 and the second carrier 408 to rotate relative to the second ring gear 406. As described above, rotating each component of the planetary gears 402, 404 may increase the mechanical advantage of the planetary gears 402, 404. For example, if each of the first input 102 and the second input 104 are rotating at substantially the same speed in opposite directions, the gear ratio becomes:

$$\frac{2R+S}{S}$$

The housing 108 rotating in an opposite direction from the first input 102 similarly maintains the counter rotation of the second sun gear 414 relative to the first sun gear 416, such that the first output 202 and the second output 204 rotate in opposite directions. Furthermore, the first output 202 and the second output 204 may rotate at a higher rate of speed due to the increase gear ratio described above. The relative rotational speed between the first output 202 and the second output 204 may be about double the rotational speed of each individual output 202, 204 due to the counter rotation.

In some embodiments, the gear ratios of the first planetary gear 402 and the second planetary gear 404 may be different. As illustrated in FIG. 4, the second sun gear 414 may have a larger diameter than the first sun gear 416. For example, the larger diameter of the second sun gear 414 may facilitate the first output 202 passing through a central portion of the second sun gear 414 to reach the first sun gear 416. An output bearing 428 may be positioned between the first output 202 and the second output 204. The output bearing 428 may reduce friction between the first output 202 and the second output 204, which may increase efficiency of the gear drive 100 and may reduce wear between the first output 202 and the second output 204.

The outputs 202, 204 may be shafts configured to create an interference connection with the respective sun gears 414, 416. For example, the shafts may include splines (e.g., teeth) configured to interface with complementary splines in the sun gears 414, 416. In another example, the shafts may have an interference fit with the respective sun gears 414, 416 such that compression forces between a surface of the shafts and the respective sun gears 414, 416 transfer the rotation. In another example, the shafts may be secured to the sun gears 414, 416 through a hardware connection (e.g., bolts, pins, studs, screws, rivets, etc.) or a welded, brazed, or soldered connection.

Figure 5:
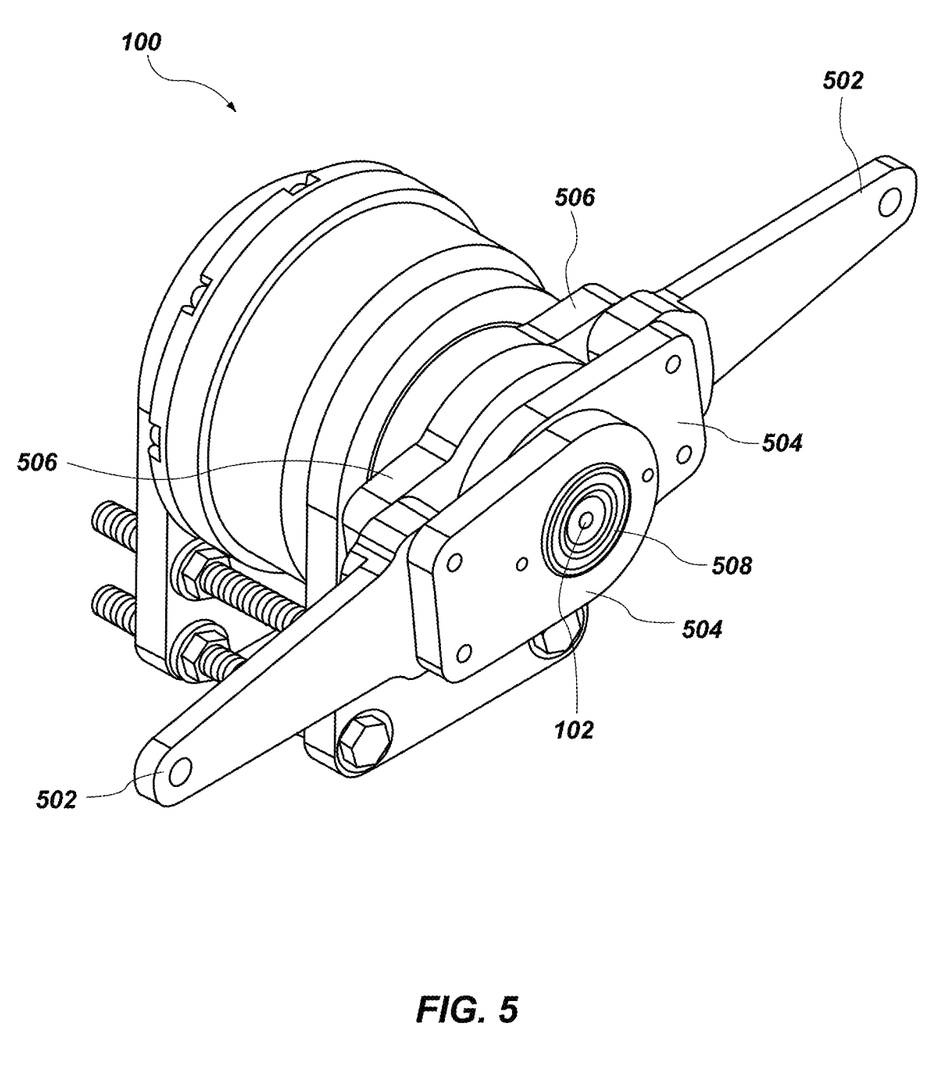
FIG. 5 illustrates an assembly including the gear drive of FIGS. 1 and 2 in accordance with embodiments of the disclosure.

FIG. 5 illustrates an embodiment of the gear drive 100 configured to receive linear input motion. The gear drive 100 may be configured to receive oscillating linear motion, such as from vehicle suspension or waves on a body of water, through one or more input arms 502. The input arms 502 may be coupled to the gear drive 100 through first input brackets 504 and second input brackets 506. For example, each of the input arms 502 may be coupled to the first input 102 through first input brackets 504. The first input brackets 504 may be coupled to the first input 102 through one-way bearings 508 (e.g., sprag bearings) configured to transmit rotation in a first direction and rotate freely in a second direction, such that rotation is only transmitted to the first input 102 in the first direction. Each of the input arms 502 may also be coupled to the second input 104 (FIG. 1) through second input brackets 506. The second input brackets 506 may similarly be coupled to the second input 104 (FIG. 1) through one-way bearings 508 in an opposite orientation, such that the one-way bearings 508 only transmit rotation to the second input 104 (FIG. 1) in a second direction. Thus, when the oscillating linear motion causes the input arms 502 to rotate in the first direction the input arms 502 transmit the rotation to the first input 102 while rotating freely about the second input 104 (FIG. 1) and when the oscillating linear motion causes the input arms 502 to rotate in the second direction the input arms 502 transmit the rotation to the second input 104 (FIG. 1) while rotating freely about the first input 102. Thus, the oscillating motion may cause the first input 102 and the second input 104 (FIG. 1) to rotate in opposite directions, which may be multiplied through the gear drive 100 as described above.

The embodiments of the disclosure may enable the capture of oscillating motion and/or rotational motion in one or two directions and its transmission into two counter rotating outputs. Counter rotating outputs may increase relative rotational speed between two components, such as a stator and rotor of an electrical generator. The increase relative rotational speed may increase an output of the electrical generator. In other embodiments, the counter rotating outputs may be used to drive counter rotating components, such as impellers, heads, bits, paddles, etc., of a device through a single input.

Embodiments of the disclosure may provide two counter rotating inputs. As described above, the counter rotating inputs may provide larger gear ratios in relatively small gear drives with planetary gears. The larger gear ratios may facilitate capturing energy from smaller movements and/or may facilitate greater mechanical advantages generated from smaller forces.

In the example shown above, the gear drive 100 includes two planetary gears 402, 404. In some examples, a gear drive may include more than two planetary gears based on a desired gear ratio. The planetary gears may be modular such that any number of planetary gears may be incorporated into a gear drive to achieve a desired gear ratio.

Figures 6A, 6B:
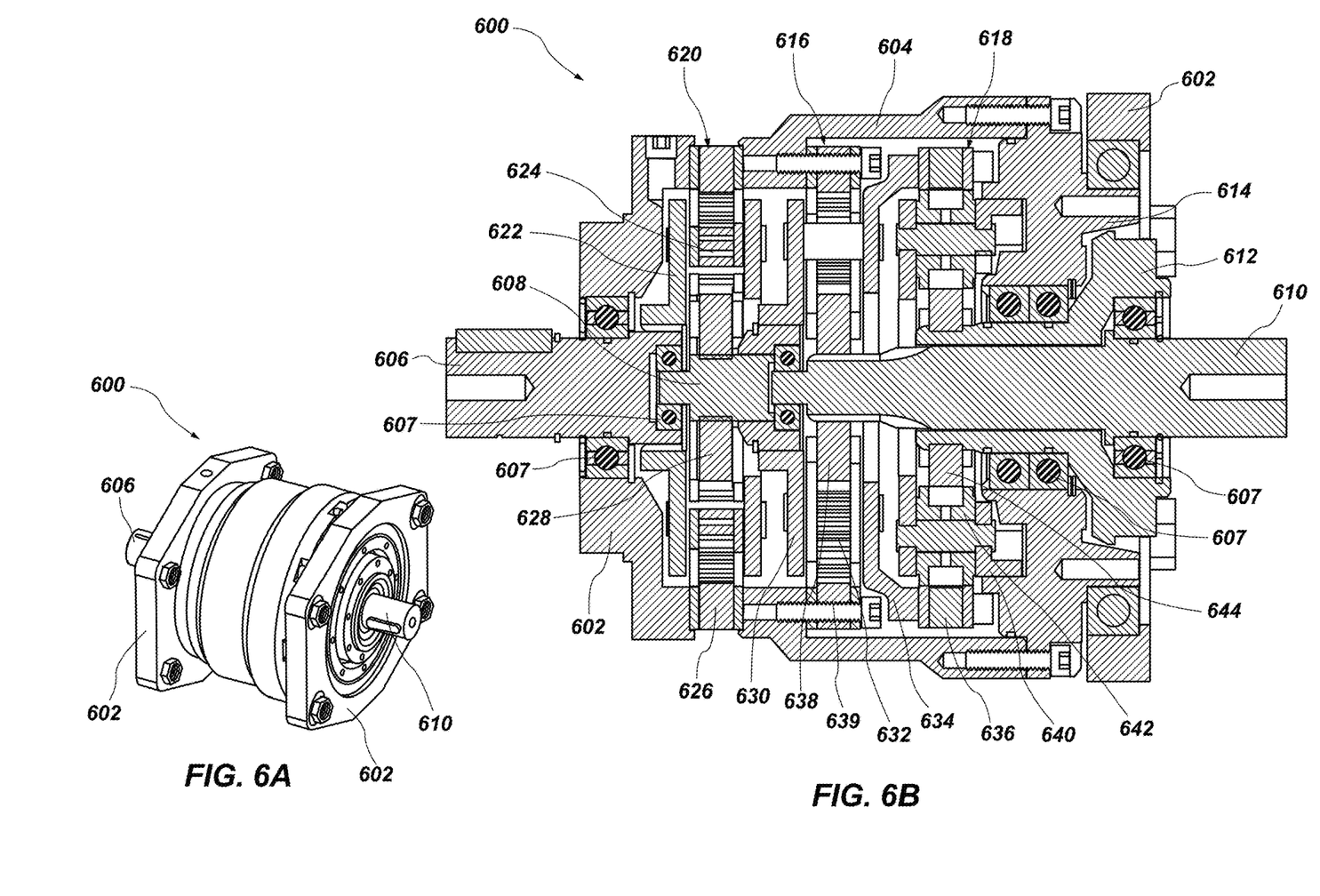
FIG. 6A illustrates a perspective view of a gear drive and FIG. 6B illustrates a cross-sectional view of the gear drive of FIG. 6A.

FIG. 6A illustrates a perspective view of a gear drive and FIG. 6B illustrates a cross-sectional view of the gear drive of FIG. 6A. In FIGS. 6A and 6B, a gear drive 600 may comprise brackets 602 (similar to brackets 106 discussed above) for mounting the gear drive 600 to a component that is stationary relative to the gear drive 600. The gear drive 600 may comprise a housing 604 that may form an outer case configured to house (e.g., surround) the internal gears of the gear drive 600 (similar to housing 108 described above).

In this example, the gear drive 600 may comprise a first input 606. The first input may be a shaft coupled to internal gears in the gear drive 600. Bearings 607 may be provided to facilitate rotation of the first input 606 relative to the brackets 602. The gear drive 600 may further comprise an intermediate member 608. The intermediate member 608 may be a shaft coupled to internal gears in the gear drive 600. The intermediate member 608 may be disposed to be aligned with the first input 606. Additional bearings 607 may facilitate rotation of the intermediate member 608 relative to the first input 606.

The gear drive 600 may further comprise a first output 610. The first output 610 may be a shaft coupled to internal gears of the gear drive 600. The first output 610 may be aligned with the intermediate member 608 and the first input 606. Additional bearings 607 may facilitate rotation of the first output 610 relative to the intermediate member 608. The gear drive 600 may also comprise a second output 612. The second output 612 may comprise a hollow shaft that surrounds the first output 610 and that is coupled to internal gears of the gear drive 600. The second output 612 may rotate independent of the first output 610 via bearings 607. The gear drive 600 may also comprise a third output 614 surrounding the second output 612 and being configured to rotate independently relative to the second output 612 via bearings 607. The third output 614 may also be coupled to internal gears of the gear drive 600.

As mentioned above, a gear drive may have any number of planetary gears based on a desired gear ratio. In this example, the gear drive 600 may comprise a first planetary gear 616, a second planetary gear 618, and a third planetary gear 620. The first planetary gear 616, the second planetary gear, 618, and the third planetary gear 620 may be axially aligned with the first input 606, the intermediate member 608, and the outputs 610, 612, 614. The first and second planetary gears 616, 618 may be similar to the first and second planetary gears 402, 404 discussed above. In the gear drive 600, the third planetary gear 620 and the intermediate member 608 may be considered modular members that may be added to the first and second planetary gears 616, 618 to achieve a desired gear ratio. Furthermore, while just the third planetary gear 620 and the intermediate member 608 are shown in FIGS. 6A and 6B, there may be additional modular members added to a gear drive depending on a desired gear ratio.

The first input 606 may be coupled to a carrier 622 of the third planetary gear 620. In some examples, the first input 606 may be formed integrally with the carrier 622. The first input 606 may also be formed separately from the carrier 622 and may be press fit into the carrier 622 or may otherwise be coupled thereto such as via a fastener, welding, or other suitable joining method. The carrier 622 is attached to the planet gears 624 of the third planetary gear 620 via spindles. The teeth of the planet gears 624 may interface with the interior teeth of a ring gear 626 of the third planetary gear 620 and may interface with teeth of the sun gear 628 of the third planetary gear 620.

The sun gear 628 of the third planetary gear 620 may be coupled to the intermediate member 608. The intermediate member 608 may be further coupled to a carrier 630 of the first planetary gear 616. The carrier 630 may support planet gears 632 and may also comprise or otherwise be connected to a coupler 634 connecting the carrier 630 to a ring gear 636 of the second planetary gear 618. Teeth of the planet gears 632 may interface with inner teeth of a ring gear 639 of the first planetary gear 616. The ring gear 639 may be coupled to the housing 604 and may thus rotate with (or be fixed with) the housing 604. The teeth of the planet gears 632 may also interface with teeth of a sun gear 638 of the first planetary gear 616. The sun gear 638 of the first planetary gear 616 may be coupled with the first output 610 of the gear drive 600 to rotate the first output 610.

The ring gear 636 of the second planetary gear 618 may have inner teeth that interface with planet gears 642 associated with a carrier 640. The planet gears 642 may interface with a sun gear 644 of the second planetary gear 618. The sun gear 644 may be coupled with the second output 612 to rotate the second output 612. With the above-described connections between the first input 606, the intermediate member 608, and the first through the third planetary gears 616, 618, 620, the first output 610 and the second output 612 may be operable to rotate in opposite directions based on a rotational input to the first input 606.

The carrier 640 of the second planetary gear 618 may be coupled to the third output 614. The third output 614 may be coupled with the housing 604, and thus the third output may be operable to rotate with (or remain fixed with) the housing 604. In this example, by utilizing a modular, third planetary gear 620, the gear ratio between the first input 606 and the counter rotating first and second outputs 610, 612 may be increased by a desired amount. In other examples, additional modular, planetary gears may be added depending on a desired gear ratio.

Figures 7A, 7B:
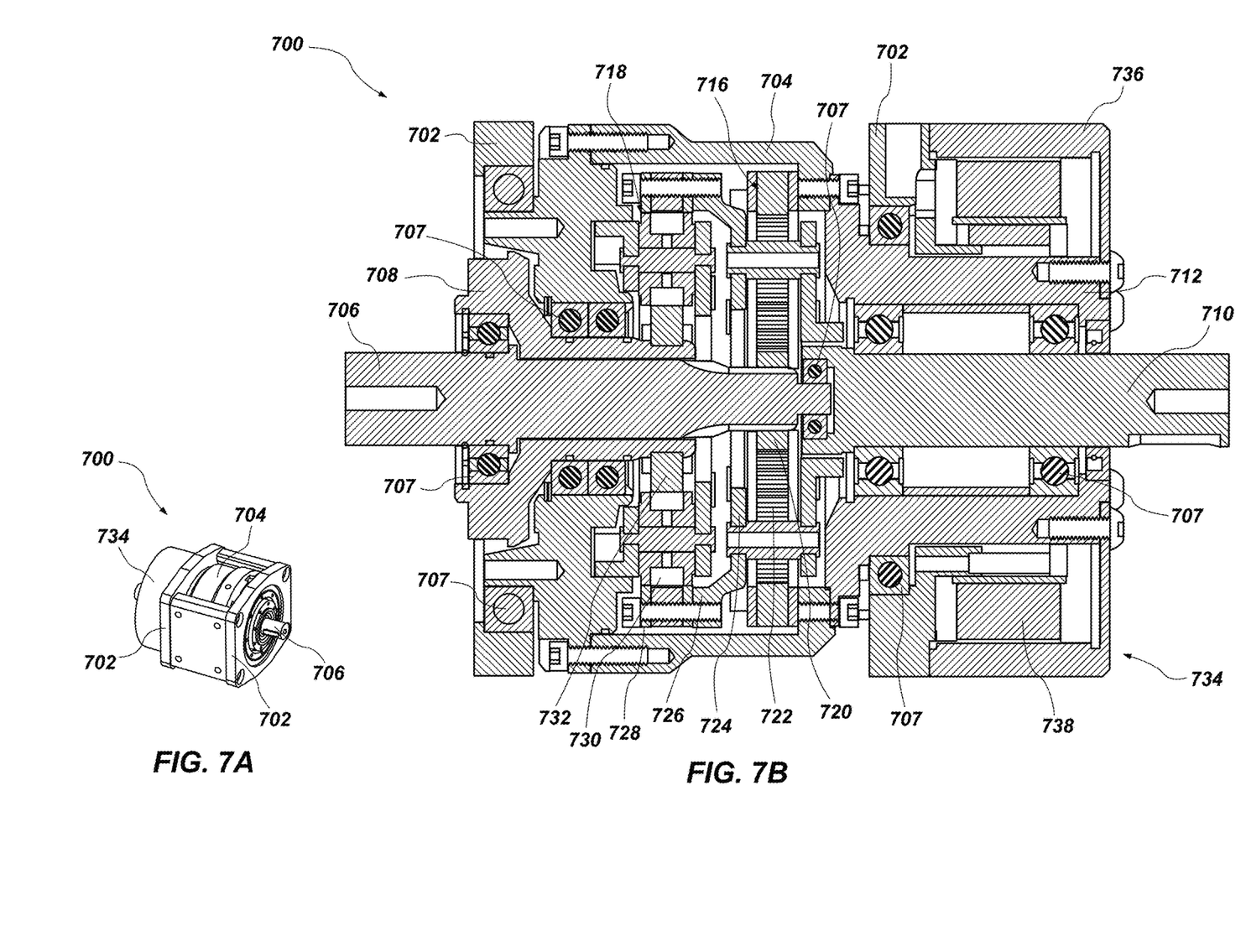
FIG. 7A illustrates a perspective view of a gear drive and FIG. 7B illustrates a cross-sectional view of the gear drive of FIG. 7A.

FIG. 7A illustrates a perspective view of a gear drive and FIG. 7B illustrates a cross-sectional view of the gear drive of FIG. 7A. In this example, a gear drive 700 may comprise counter rotating inputs that are operable to drive an output to power a generator. The gear drive 700 may comprise brackets 702 that may be operable to mount the gear drive 700 to a component that is stationary relative to the gear drive 700. The gear drive 700 also comprises a housing 704 that may form an outer case configured to house (e.g., surround) the internal gears of the gear drive 700 (similar to housing 108 described above).

The counter rotating inputs of the gear drive 700 may comprise a first input 706 and a second input 708. The first input 706 may comprise a shaft coupled to internal gears of the gear drive 700. The second input 708 may comprise a hollow shaft that is configured to surround the first input 706 and is operable to rotate independent of the first input 706 via bearings 707. The second input 708 may couple with internal gears of the gear drive 700. The gear drive 700 may further comprise a first output 710 and a second output 712. The first output 710 may comprise a shaft and the second output 712 may comprise a hollow shaft that is configured to surround the first output 710. The first output 710 may rotate independently of the second output 712 via bearings 707. The first output 710 may couple with internal gears of the gear drive 700. The second output 712 may be coupled with the housing 704 such that it rotates with (or remains stationary with) the housing 704.

In this example, the gear drive may comprise a first planetary gear 716 and a second planetary gear 718. The first and second planetary gears 716, 718 may be axially aligned with the first and second inputs 706, 708 and the first and second outputs 710, 712. The first and second planetary gears 716, 718 may be similar to the first and second planetary gears 402, 404 discussed above.

The first input 706 may be coupled to the sun gear 720 of the first planetary gear 716. In some examples, the first input 706 may be formed integrally with the sun gear 720. In some examples, the first input 706 may be formed separately from the sun gear 720 and may be press fit into the sun gear 720 or may otherwise be coupled thereto such as via a fastener, welding, or other suitable joining method. The sun gear 720 may interface with planet gears 722 of the first planetary gear 716. The planet gears 722 are coupled to the carrier 724 of the first planetary gear by way of spindles. In this example, the first output 710 may be coupled to the carrier 724 of the first planetary gear 716. The carrier 724 may further be coupled with the ring gear 728 of the second planetary gear 718 via a coupler 726.

The ring gear 728 of the second planetary gear 718 may interface with planet gears 730 of the second planetary gear 718. The planet gears 730 may interface with the sun gear 732 of the second planetary gear 718. The second input 708 may be coupled with the sun gear 732 of the second planetary gear 718.

It is noted that the above-described features of the gear drive 700 may be substantially similar to the gear drive 100 shown in FIG. 4. However, the gear drive 700 is operable in the reverse direction as compared to the gear drive 100. In other words, the first and second inputs 706, 708 of the gear drive 700 correspond with the first and second outputs 202, 204 of the gear drive 100. Similarly, the first and second outputs 710, 712 of the gear drive 700 correspond with the first and second inputs 102, 104 of the gear drive 100. This allows a gear drive (e.g., the gear drive 100 or the gear drive 700) to be operable in either direction. By operating a gear drive in one direction, the gear drive may "gear down" from the inputs to the outputs, and by operating the gear drive in the opposite direction, the gear drive may "gear up" from the inputs to the outputs.

In this example, the gear drive 700 may further comprise an electric generator 734 that may be operable to provide resistance to one or more components of the gear drive 700 to dynamically control a gear ratio of the gear drive 700. The generator 734 may comprise a rotor 736. The rotor may be coupled to the second output 712, which is coupled to the housing 704. Thus, the rotor may be operable to rotate with the housing 704. The generator 734 may further comprise stator coils 738. The generator 734 may thus provide resistance to the rotation of the second output 712 and the housing 704 to dynamically control the gear ratio of the gear drive 700.

Figures 8A, 8B:
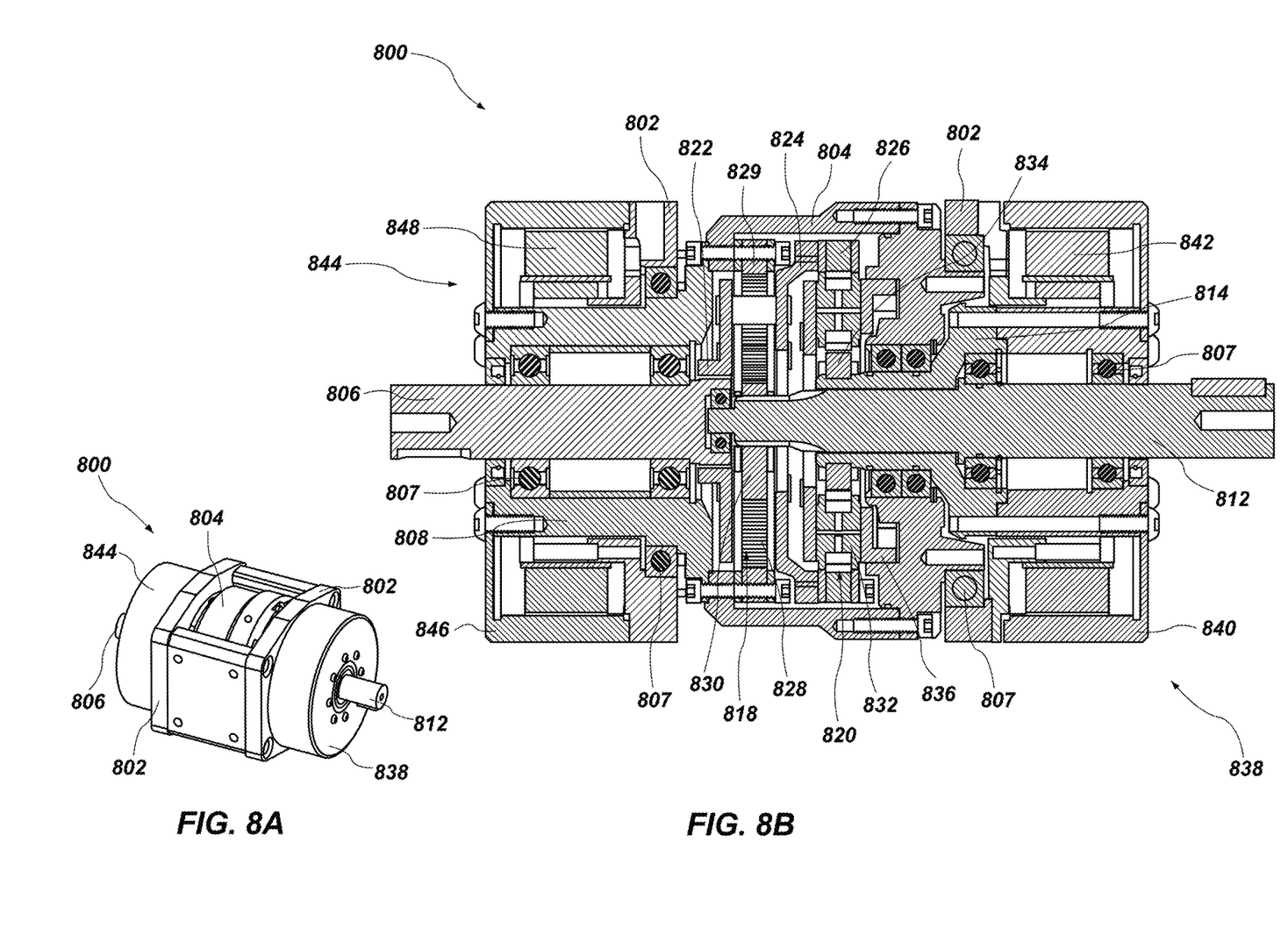
FIG. 8A illustrates a perspective view of a gear drive and FIG. 8B illustrates a cross-sectional view of the gear drive of FIG. 8A.

While FIGS. 7A and 7B show an example with one generator coupled to an output of the gear drive, it may also be beneficial to utilize more than one generator to control a gear ratio of a gear drive. FIG. 8A illustrates a perspective view of a gear drive 800 and FIG. 8B illustrates a cross-sectional view of the gear drive 800 of FIG. 8A. The gear drive 800 may comprise brackets 802 (similar to brackets 106 discussed above) for mounting the gear drive 800 to a component that is stationary relative to the gear drive 800. The gear drive 800 may also comprise a housing 804 that may form an outer case configured to house (e.g., surround) the internal gears of the gear drive 800 (similar to housing 108 discussed above).

The gear drive 800 may comprise a first input 806. The first input may be a shaft coupled to internal gears in the gear drive 800. The gear drive 800 may further comprise a second input 808 that is coupled to internal gears of the gear drive 800. The second input 808 may be axially aligned with the first input 806 and may comprise a hollow shaft that is configured to surround the first input 806 and rotate independently from the first input 806 via bearings 807.

The gear drive 800 may further comprise a first output 812. The first output 812 may be a shaft coupled to internal gears of the gear drive 800. The first output 812 may be axially aligned with the first and second inputs 806, 808. The gear drive 800 may comprise a second output 814. The second output 814 may comprise a hollow shaft that is axially aligned with and surrounds the first output 812 and that rotates independently from the first output 812 via bearings 807.

The gear drive 800 may have a number of planetary gears depending on a desired gear ratio. In this example, the gear drive 800 may comprise a first planetary gear 818 and a second planetary gear 820. The first and second planetary gears 818, 820 may be axially aligned with the first and second inputs 806, 808 and the first and second outputs 812, 814. The first and second planetary gears 818, 820 may be similar to the first and second planetary gears 402, 404 discussed above.

The first input 806 may be coupled to a carrier 822 of the first planetary gear 818. In some examples, the first input 806 may be formed integrally with the carrier 822. The first input 806 may also be formed separately from the carrier 822 and may be press fit into the carrier 822 or may otherwise be coupled thereto such as via a fastener, welding, or other suitable joining method. The carrier 822 may comprise a coupler 824 that is coupled with a ring gear 826 of the second planetary gear 820. The carrier 822 may support planet gears 828 of the first planetary gear 818 via spindles.

The planet gears 828 may interface with a ring gear 829 of the first planetary gear 818. The ring gear 829 may be coupled to the housing 804 such that the ring gear 829 rotates with the housing 804. The second input 808 may be coupled to the housing 804 and thus the ring gear 829 such that the second input 808 rotates with the housing 804 and the ring gear 829 of the first planetary gear 818. The planet gears 828 further interface with the sun gear 830 of the first planetary gear 818. The sun gear 830 may be coupled to the first output 812 to rotate the first output 812.

The ring gear 826 of the second planetary gear 820 may interface with the planet gears 832 of the second planetary gear 820. The planet gears 832 may be supported by a carrier 836 via spindles. The planet gears 832 may interface with a sun gear 834 of the second planetary gear 820. The sun gear 834 may interface with the second output 814 to rotate the second output 814.

Similar to the gear drive 700 discussed above, the gear drive 800 may be dynamically control via a generator. In this example, the gear drive 800 may comprise a first generator 838 disposed on an output side of the gear drive 800. The first generator 838 may comprise a rotor 840 that is coupled to the second output 814 of the gear drive. The generator may further comprise stator coils 842 that are supported by the brackets 802. Similar to the generator 734 discussed above, the generator 838 may provide variable resistance to the second output to dynamically control the gear ratio of the gear drive.

In addition to the first generator 838 attached to the second output 814, the gear drive 800 may comprise a second generator 844 disposed on an input side of the gear drive 800. In this example, the second generator 844 may comprise a rotor 846 that is coupled to the second input 808. The generator 844 may further comprise stator coils 848 supported by the brackets 802. The generator 844 may dynamically control resistance to the second input 808 to control the gear ratio of the gear drive 800. By providing an additional generator in the gear drive 800, further refinement and control of the gear ratio of the gear drive may be achieved.

In some embodiments, the second generator 844 may be configured as an electric motor configured to input rotation into the second input 808. The rotational input from the second generator 844 acting as a motor may control rotation of the housing 804, which may add to the dynamic control of the gear drive 800. For example, the second generator 844 may control rotation of the ring gear 829 and the carrier 836, while the first generator 838 controls rotation of the sun gear 834. Thus, the perceived gear ratio of the gear drive 800 may be controlled through both the second generator 844 inputting rotation to the respective components and the first generator 838 limiting rotation of the respective components.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this disclosure. Indeed, various modifications of the present disclosure, in addition to those shown and described herein, such as alternative useful combinations of the elements described, may become apparent to those skilled in the art from the description. Such modifications and embodiments are also intended to fall within the scope of the appended claims and their legal equivalents.

What is claimed is:

1. A gear box comprising:
   a first planetary gear and a second planetary gear;
   a first carrier of the first planetary gear coupled to a second ring gear of the second planetary gear;
   a first ring gear of the first planetary gear coupled to a second carrier of the second planetary gear;
   a first sun gear of the first planetary gear coupled to a first output shaft;
   a second sun gear of the second planetary gear coupled to a second output shaft, the second output shaft surrounding the first output shaft and being concentric with the first output shaft; and a housing surrounding the first planetary gear and the second planetary gear, wherein the housing is configured to rotate relative to the first planetary gear and the second planetary gear.

2. The gear box of claim 1, wherein the first output shaft is configured to rotate in a first direction and the second output shaft is configured to rotate in a second direction opposite the first direction.

3. The gear box of claim 1, further comprising a first input shaft coupled to the first carrier.

4. The gear box of claim 3, further comprising a second input shaft coupled to the first ring gear, the second input shaft surrounding the first input shaft and being concentric with the first input shaft.

5. The gear box of claim 3, wherein the first planetary gear defines a gear ratio between the first input shaft and the first output shaft of at least 10:1.

6. The gear box of claim 1, wherein the housing is coupled to the first ring gear of the first planetary gear and the second carrier of the second planetary gear.

7. A method of transferring motion comprising:
receiving a rotational input in a first direction at a first carrier of a first planetary gear;
rotating a second ring gear of a second planetary gear through a first coupling between the first carrier and the second ring gear;
coupling a second carrier of the second planetary gear to a first ring gear of the first planetary gear through a second coupling between the first ring gear and the second carrier;
causing a first output shaft to rotate in the first direction through a first drive interface between a first set of planet gears coupled to the first carrier and a first sun gear, the first output shaft coupled to the first sun gear;
causing a second output shaft to rotate in a second direction opposite the first direction through a second drive interface between a second set of planet gears coupled to the second carrier and a second sun gear, the second output shaft coupled to the second sun gear, the second output shaft surrounding the first output shaft; and
receiving a second rotational input in the second direction at the first ring gear.

8. The method of claim 7, further comprising rotating the second carrier in the second direction through the second coupling between the first ring gear and the second carrier.

9. The method of claim 7, further comprising rotating a housing surrounding the first planetary gear and the second planetary gear in the second direction.

10. The method of claim 7, wherein coupling the second carrier of the second planetary gear to the first ring gear of the first planetary gear through the second coupling between the first ring gear and the second carrier comprises coupling the second carrier of the second planetary gear to the first ring gear of the first planetary gear through a housing surrounding the first planetary gear and the second planetary gear.

11. The method of claim 7, further comprising receiving oscillating linear motion through an input arm, the input arm rotating the rotational input in the first direction through a first one-way bearing, the input arm rotating the second rotational input in the second direction through a second one-way bearing.

12. A gear drive comprising:
a first rotational input;
a second rotational input concentric with and surrounding the first rotational input;
a first planetary gear;
a first carrier of the first planetary gear coupled to the first rotational input;
a first ring gear of the first planetary gear coupled to the second rotational input;
a first sun gear of the first planetary gear coupled to a first output shaft; and
a second planetary gear comprising:
a second ring gear coupled to the first carrier of the first planetary gear; and
a second carrier coupled to the first ring gear of the first planetary gear,
wherein the first rotational input is configured to rotate in a first direction and the second rotational input is configured to rotate in a second direction opposite the first direction.

13. The gear drive of claim 12, further comprising an input arm coupled to the first rotational input through a first one-way bearing and coupled to the second rotational input through a second one-way bearing.

14. The gear drive of claim 13, wherein the first one-way bearing is configured to transfer rotation in the first direction and the second one-way bearing is configured to transfer rotation in the second direction opposite the first direction.

15. The gear drive of claim 12, further comprising a second output shaft coupled to a second sun gear of the second planetary gear, the second output shaft surrounding the first output shaft.

16. A method of transferring motion comprising:
receiving a rotational input in a first direction at a first carrier of a first planetary gear;
rotating a second ring gear of a second planetary gear through a first coupling between the first carrier and the second ring gear;
coupling a second carrier of the second planetary gear to a first ring gear of the first planetary gear through a second coupling between the first ring gear and the second carrier;
causing a first output shaft to rotate in the first direction through a first drive interface between a first set of planet gears coupled to the first carrier and a first sun gear, the first output shaft coupled to the first sun gear;
causing a second output shaft to rotate in a second direction opposite the first direction through a second drive interface between a second set of planet gears coupled to the second carrier and a second sun gear, the second output shaft coupled to the second sun gear, the second output shaft surrounding the first output shaft; and
receiving a second rotational input in the second direction at the first ring gear,
wherein coupling the second carrier of the second planetary gear to the first ring gear of the first planetary gear through the second coupling between the first ring gear and the second carrier comprises coupling the second carrier of the second planetary gear to the first ring gear of the first planetary gear through a housing surrounding the first planetary gear and the second planetary gear.

* * * * *